(12) United States Patent
Goss et al.

(10) Patent No.: US 8,991,812 B2
(45) Date of Patent: Mar. 31, 2015

(54) DISCERNING BETWEEN ORIGINAL MEDIA AND BLANK MEDIA IN A COMMON FEED PATH PRINTER DEVICE

(75) Inventors: Steven Goss, Corvallis, OR (US); Gregory F. Carlson, Corvallis, OR (US); James D. Bledsoe, Corvallis, OR (US); Todd A. McClelland, Corvallis, OR (US); Roger Switzer, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 985 days.

(21) Appl. No.: 11/972,514

(22) Filed: Jan. 10, 2008

(65) Prior Publication Data

US 2008/0165369 A1    Jul. 10, 2008

Related U.S. Application Data

(60) Provisional application No. 60/884,327, filed on Jan. 10, 2007.

(51) Int. Cl.
  *B65H 3/44*     (2006.01)
  *B65H 5/26*     (2006.01)
  *H04N 1/00*    (2006.01)
  (Continued)

(52) U.S. Cl.
  CPC ........... *H04N 1/0057* (2013.01); *B41J 11/0075* (2013.01); *B41J 11/0095* (2013.01); *B41J 11/50* (2013.01); *B41J 13/103* (2013.01); *H04N 1/00588* (2013.01); *H04N 1/00596* (2013.01); *H04N 1/00612* (2013.01); *H04N 1/00623* (2013.01); *H04N 1/00681* (2013.01); *H04N 1/00689* (2013.01); *H04N 1/00692* (2013.01); *H04N 1/00694* (2013.01); *H04N 1/00724* (2013.01); *H04N 1/00734* (2013.01); *H04N 1/00779* (2013.01); *H04N 1/0461* (2013.01); *H04N 2201/0091* (2013.01)
  USPC ......................... 271/9.13; 371/9.01; 371/3.14

(58) Field of Classification Search
  USPC ....................................................... 271/3.14
  See application file for complete search history.

(56) References Cited

U.S. PATENT DOCUMENTS 5,727,890 A * 3/1998 Stodder et al. ................ 400/624
5,775,684 A * 7/1998 Jackson et al. ............... 271/9.07
(Continued)

FOREIGN PATENT DOCUMENTS

CN           1583535 A      2/2005
CN           1712229 A     12/2005
(Continued)

*Primary Examiner* — Patrick Cicchino (57) ABSTRACT

Methods, apparatuses, and systems that facilitate common feed path printing devices to discern between original media and blank media are described herein. The novel systems may include, among other things, a print and a scan mechanism having a common input path to receive a first and a second media, the first media being original media to be scanned by the scan mechanism, and the second media being blank media to be printed on by the print mechanism. The system may further include a divider and a first sensor. The divider being configured to provide to the common feed path the first and the second media by defining a first and a second input slot to locate the first and the second media, respectively, wherein the divider to provide the first and the second media to the common feed path via the first and second input slots. The first sensor may detect absence of the first media in the first input slot.

20 Claims, 10 Drawing Sheets (51) Int. Cl.
*B41J 11/00* (2006.01)
*B41J 11/50* (2006.01)
*B41J 13/10* (2006.01)
*H04N 1/04* (2006.01)

(56) References Cited

U.S. PATENT DOCUMENTS 6,029,970 A * 2/2000 Hwang ......................... 271/9.08
6,315,280 B1 * 11/2001 Jang ............................. 271/9.02
6,929,414 B2 * 8/2005 Kadomatsu ................ 400/608.2
7,349,127 B2 * 3/2008 Kadomatsu ................... 358/296

FOREIGN PATENT DOCUMENTS

| | | |
|---|---|---|
| EP | 0 650 843 A2 | 5/1995 |
| EP | 1 610 541 A1 | 12/2005 |
| JP | 02257755 A | 10/1990 |
| JP | 7271245 A | 10/1995 |
| JP | 08256195 A | 10/1996 |
| JP | 09329931 A | 12/1997 |
| JP | 2006013654 | 1/2006 |
| JP | 2006160379 | 6/2006 |

* cited by examiner

DISCERNING BETWEEN ORIGINAL MEDIA AND BLANK MEDIA IN A COMMON FEED PATH PRINTER DEVICE

CROSS-REFERENCES TO RELATED APPLICATIONS

The present application claims priority to U.S. patent application Ser. No. 60/884,327 filed Jan. 10, 2007, entitled "FOUR METHODS FOR DISCERNING ORIGINAL DOCUMENTS TO BE SCANNED OR COPIED FROM PAGES TO BE PRINTED IN MULTIFUNCTION DEVICE WITH COMMON PAPER PATH," the entire disclosure of which is hereby incorporated by reference in its entirety for all purposes.

TECHNICAL FIELD

Embodiments of the present invention relate to the field of printers, and more particularly, to discerning original media from blank media to a printer having a common feed path.

BACKGROUND

There has been a greater and greater demand for devices that are compact and highly functional to accommodate today's mobile and dynamic lifestyles. For instance, computing devices, including laptop computers and personal digital assistants (PDAs) are already very compact and mobile while still being able to offer the same types of functionality offered by their bigger brethren.

In recent years, there has also been a trend to make other devices, such as peripheral devices associated with these computing devices, similarly more compact and mobile. Such devices include printers or printing devices. A printing device, as described herein, refers to single function devices, such as copiers or fax machines, or multifunction devices, such as printer/copy/scan/fax machines. These printing devices typically have at least two functions that they must perform. First, they must be able to scan or copy (herein "scan") original media such as original documents embodied in, for example, sheets of written or printed paper. Second, they must be able to print onto blank media, such as blank sheets of paper.

Recently, printing devices having common feed paths have been proposed. These devices use only a single input path to process both original media (i.e., scan or copy the original media) and blank media (i.e., print onto the blank media). One drawback associated with these common feed path printers is that they are unable to automatically distinguish between original media from blank media or blank sheets that are being fed to the common feed path.

SUMMARY OF INVENTION

According to various embodiments of the present invention, methods, apparatuses, and systems are provided that facilitate common feed path printing devices to discern between original media and blank media. The novel systems may include, among other things, a print and a scan mechanism having a common input path to receive a first and a second media, the first media being original media to be scanned by the scan mechanism, and the second media being blank media to be printed on by the print mechanism. The system may further include a divider and a first sensor. The divider being configured to provide to the common feed path the first and the second media by defining a first and a second input slot to locate the first and the second media, respectively, wherein the divider functions to provide the first and the second media to the common feed path via the first and second input slots. The first sensor may detect absence of the first media in the first input slot. In some embodiments, the system may further include an input tray coupled to the divider.

In some embodiments, the system may further include a processor to control the print mechanism to initiate printing onto the second media based, at least in part, on the detection by the sensor of the absence of the first media in the first input slot. The system may further include a roller to feed to the common input path the first media prior to feeding the second media to the common input path. In some embodiments, the print mechanism may further comprise a second sensor to detect absence of the second media in the common input path.

In some embodiments, the divider may be a stationary divider relative to the input tray. For these embodiments, the first sensor may be coupled to the divider and disposed at the first input slot, and the divider may be a flipper that is at least partially rotatable relative to the input tray. The flipper may have a U-shape and may be comprised of an elongated member and two perpendicular members, the elongated member having two opposite ends and the two perpendicular members being coupled to the two ends of the elongated member, the two perpendicular members further being partially rotatably coupled to the input tray.

In some embodiments, the flipper may be configured to be coupled to the input tray to be rotatably located in at least two different selected positions relative to the input tray, a first position when the first input slot is devoid of the first media and a second position when the first input slot includes the first media, the second input slot being located, at least in part, between the divider and the input tray and the first input slot being located, at least in part, on a side of the divider opposite of the second input slot. In some embodiments, the flipper may be further configured to be coupled to the input tray to automatically reposition from the first position to the second position when the first input slot is devoid of the first media. In some embodiments, the first sensor may be configured to detect a position of the flipper divider relative to the input tray and to indicate when the first input slot does not include the first media.

In some embodiments, the divider may be a shutter configured to be placed between the first and the second input slots, the second input slot to be at least partly located between the shutter and the input tray, and the first input slot to be at least partly located between the sensor and the shutter on a side of the shutter opposite of the second input slot. For these embodiments, the first sensor may include a scan element to detect absence of the first media in the first input slot by scanning a surface of the shutter to detect a characteristic of the surface of the shutter. In some embodiments, the shutter includes a bar code, and the scan element may be configured to read the bar code when the first media is absent in the first input slot to detect the absence of the first media in the first input slot.

In some embodiments, the divider may be configured to provide to the common feed path a first media comprised of first one or more paper sheets through the first input slot and a second media comprised of one or more paper sheets through the second input slot, the first one or more paper sheets being one or more original documents to be scanned by the printing device and the second one or more paper sheets being one or more blank sheets to be printed on by the printing device.

The novel methods may include scanning, by a printing device having a common feed path, a surface of a medium; and determining, by the printing device, whether the medium is an original medium to be scanned by the printing device or a blank medium to be printed on by the printing device, said determining based, at least in part, on the scanning. In some embodiments, the medium may be a sheet having a surface bordered by edges, and said determining may be based on scanning of a portion of the surface located along an edge.

In some embodiments, the determining may be based on scanning of a portion of the surface located within two inches of an edge. For example, in such embodiments the user may be advised to load the first sheets into the device in an orientation so that printed matter on the first sheets will be contained within two inches of the leading edge. The distance of two inches from the edge may be used as an example of the distance between the scan element and the beginning of the print zone of the printing device and could be greater or less depending on the particular physical embodiment of the printing device. More particularly, for these embodiments, the sensor may scan only a portion of the surface of the print medium that is within a distance from the leading edge of the medium that is equal to the distance between the scanning element (i.e., sensor) and the print zone of the printing device. In some embodiments, the printing device may include a print zone. For these embodiments, the scanning and the determining may be completed prior to an edge of the medium reaching the print zone. In some embodiments, the determining may include determining based on detection of data on the surface of the data media, and if data is detected, determining that the medium is an original medium, otherwise determining that the medium is a blank medium. In some embodiments, the scanning may include scanning an entire surface of the medium, and said determining includes determining based, at least in part, on the scanning of the entire surface.

These and other aspects of various embodiments of the present will be described in greater detail in the following description.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which is depicted by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the instant description, the phrase "A/B" means A or B. For the purposes of the instant description, the phrase "A and/or B" means "(A), (B), or (A and B)." For the purposes of the instant description, the phrase "at least one of A, B and C" means "(A), (B), (C), (A and B), (A and C), (B and C) or (A, B and C)." For the purposes of the instant description, the phrase "(A)B" means "(B) or (AB)," that is, A is an optional element.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

According to various embodiments of the present invention, apparatuses and methods are provided that facilitate a common feed path printer to distinguish between original media (herein "originals") and blank media (herein "blanks") provided to the common feed path. The terms "medium" or "media" as used herein may refer to one or more sheets of paper or other types of media that may be printed on.

Figure 1:
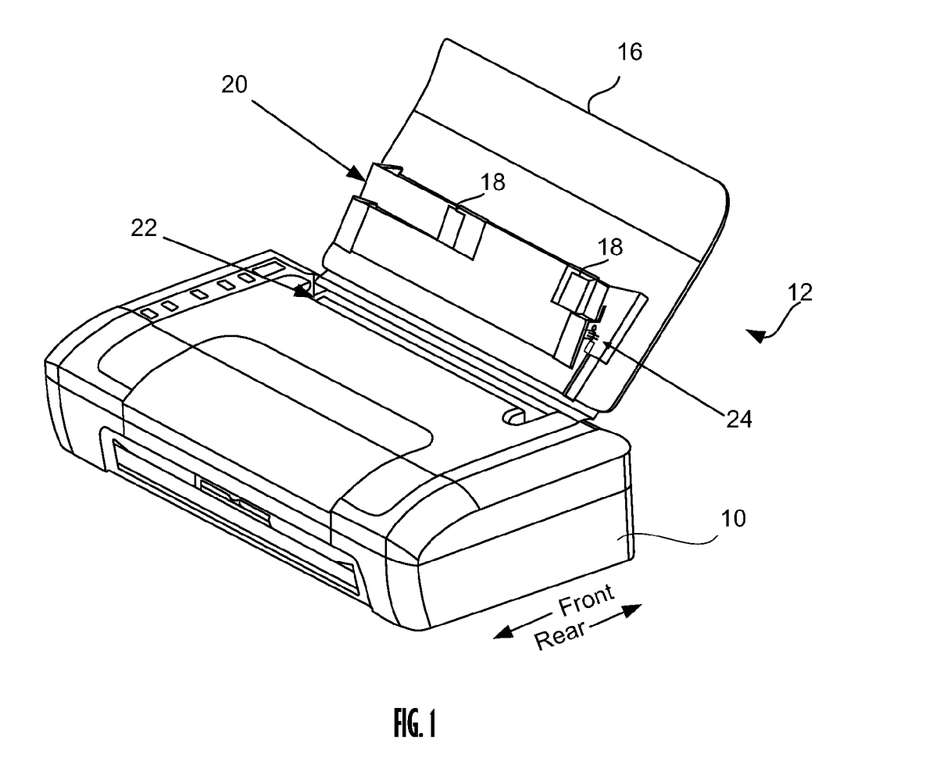
FIG. 1 is a perspective view of a printing device and a first media dispensing device, in accordance with various embodiments of the present invention.
Figure 2:
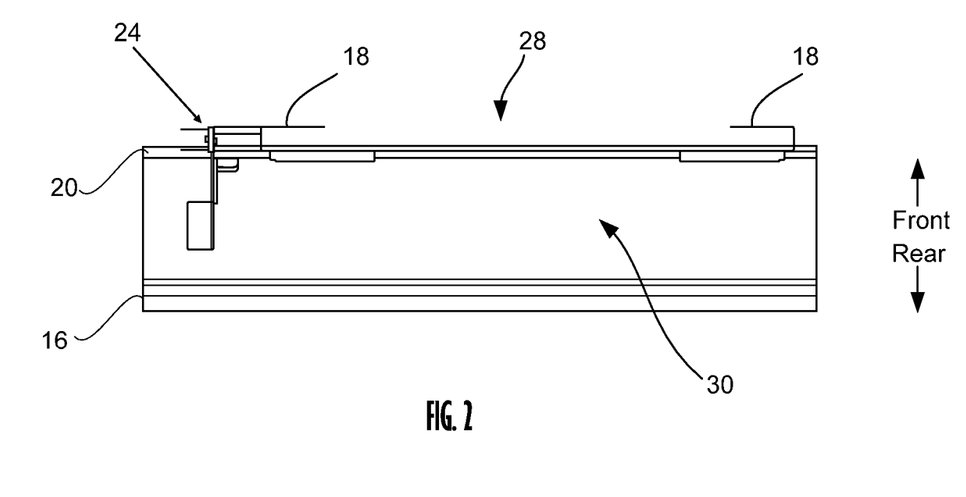
FIG. 2 is a plan or top down view of the media dispensing device of FIG. 1, in accordance with various embodiments of the present invention.
Figure 3:
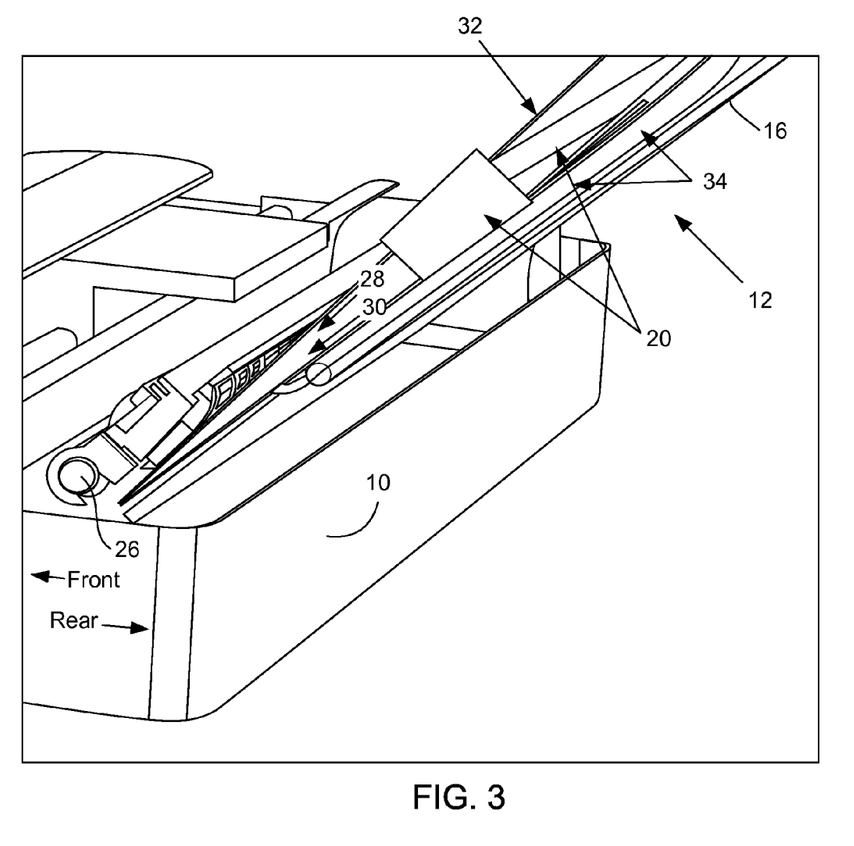
FIG. 3 is another perspective view of the printing device and the media dispensing device of FIG. 1 loaded with original and blank media, in accordance with various embodiments of the present invention.

FIGS. 1-3 illustrate a first embodiment of the present invention. In particular, FIG. 1 is a perspective view of a printing device and a media dispensing device in accordance with a first embodiment of the invention. The printing device 10 may be a laser printer, an ink-jet printer, or any other type of common feed path printing device. As further depicted, the printer 10 may include a common feed slot 22 that may be provided or fed with both originals and blanks by the media dispensing device 12. The media dispensing device 12 may include a mechanical divider (or simply "divider") 20 that is mounted to a common input tray (or simply "tray") 16. As will be further described herein, the divider 20 may define a first and a second input slot for loading originals and blanks.

Attached to the divider 20 are edge guides 18 to properly align the originals and blanks when they are dispensed or fed into the common feed slot 22. In some alternative embodiments, the divider 20 and the tray 16 may be a single unitary piece. The tray 16 may provide structural support for the originals and blanks to be loaded into the media dispensing device 12. The divider 20 may be stationary relative to the tray 16.

The divider 20, when mounted onto the tray 16, may define two input slots where the originals and the blanks may be correspondingly placed. As will be more clearly illustrated in FIGS. 2 and 3, one of the input slots is located adjacent to the tray 16 and behind or rear of the divider 20, and the other input slot is located in front of the divider 20 and the other input slot (i.e., towards the front of the printing device 10). The blanks (i.e., the blank media or sheets that will be printed on by the printing device 10), may be loaded into the input slot located towards the rear of the printing device 10 behind or rear of the divider 20, while the originals (i.e., the original media or sheets that will be scanned or copied by the printing device) may be loaded into the input slot located nearer to the front of the printing device 10 and in front of the divider 20. In this description of the first embodiment, as well as for the other embodiments to be described herein, the input slot for the originals will be referred to as the first input slot, while the input slot for the blanks will be referred to as the second input slot.

After loading the originals and blanks in the media dispensing device 12, the originals and blanks may be provided to the common feed slot 22, which is the entry point for the common feed path of the printing device 10, via the first and second input slots. As shown in FIGS. 4-8, along the common feed path and near the common feed slot 22 of the printing device 10 is a roller 26 (i.e., "pick roller") to feed the originals and/or blanks in the media dispensing device 12 into the common feed path. Because of the orientation of the media dispensing device 12 relative to the print device 10, and the presence of the pick roller, the media (i.e., originals or blanks) that are the most forward of the printing device 10 will always be fed first into the common feed path before media that are located towards the rear of the printing device 10 are fed into the common feed path. Thus, since the originals are located on the first input slot, which is forward of the second input slot where the blanks are placed, originals will always be fed into the common feed path before the blanks. Accordingly, the pick roller is operable to feed both originals and blanks into the common feed path.

The edge guides 18 are horizontally slidable along the divider 20 and may be used to guide the originals and blanks into the common input slot 22. That is, the edge guides may be used to aid the user in positioning and aligning originals as well as blanks.

A sensor 24, such as a transmissive or reflective optical sensor, may be mounted with the divider 20 in a position such that the presence of originals in the first input slot may be detected as will be further described herein. FIG. 2 is a plan view of the divider 20 of FIG. 1 in accordance with the first embodiment of the present invention. In this embodiment, the divider 20 defines a first and a second input slot. The first input slot 28 is located at the front of the divider 20, while the second input slot 30 is illustrated as being located at the rear of the divider 20 and in front of the tray 16. The originals may be loaded into the first input slot 28 using the edge guides 18 such that the left edge of the originals are aligned to the left side of the first input slot 28 (note that in FIG. 1, the originals would be aligned to the right side).

The sensor 24, in this case, is an optical sensor 24 and is located on the left side of the first input slot 28. Note that in alternative embodiments, other types of sensors other than an optical sensor 24 may be employed in order to detect the presence or absence of originals in the first input slot 28. The optical sensor 24 may be of a type employing a light emitting diode (LED) mounted on one side of the sensor, and a light sensing photo transistor mounted on the other side of the sensor. When originals are placed between the two sides of the optical sensor 24, the light from the LED is blocked from the photo transistor and the output from the photo sensor will be a "high" logic value to indicate presence of originals. On the other hand, if originals are not present in the first input slot 28, light can impinge on the photo transistor and the output from the photo sensor will be a "low" logic value to indicate absence of originals.

The printing device 10 may have programming instructions such as in the form of firmware that instructs the printing device 10 to use the output of the optical sensor 24 to determine proper behavior. For example, if the user requests that originals are to be copied, the printing device 10, executing the firmware, may first check that the output from the sensor 24 is at a "high" value to determine the presence of at least one original. If at least one original is detected in the first input slot 28, then the copy job may be allowed to proceed when the printing device is allowed to copy or scan the detected original or originals.

The printing device 10, again executing the firmware, may then control the picking and scanning of the original or originals in the first input slot 28 until the optical sensor 24 provides a "low" value indicating that all of the originals in the first input slot 28 have been fed to the common feed slot 22 by the roller 26. As the originals are being scanned, data from each original (e.g., page) may be stored in memory until the last original has been picked and scanned. The printing device 10 may then begin the printing of the blanks that have been placed into the second input slot 30. During each attempt to process a blank (e.g., blank sheet of paper), the printing device 10 may use a sensor that is located in a print mechanism of the printing device 10 to determine if the blank has been successfully picked and brought into the correct position for printing by the roller 26. By making use of this print mechanism sensor, a second sensor disposed at the second input slot 30 may not be needed in order to determine the presence or absence of blanks in the second input slot 30.

FIG. 3 is another perspective view of the printing device 10 and media dispensing device 12 of FIG. 1 in accordance with the first embodiment of the present invention. In particular, FIG. 3 illustrates the media dispenser device 20 loaded with originals 32 and blanks 34 in the first and second input slots 28 and 30, respectively. Both the originals 32 and blanks 34, through the first and second input slots 28 and 30, may be directed to the common feed slot 22, to be eventually fed to the common feed path of the printing device 10.

Figure 4:
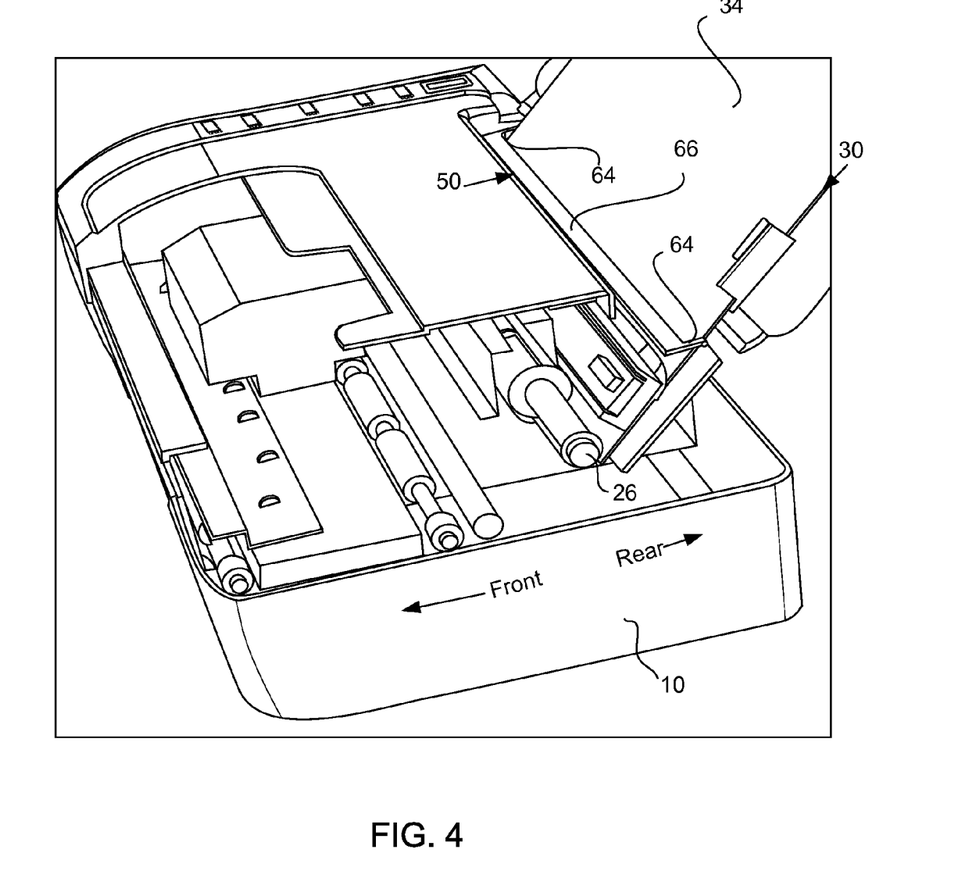
FIG. 4 is a perspective view of a printing device and a second media dispensing device, in accordance with various embodiments of the present invention.
Figure 5:
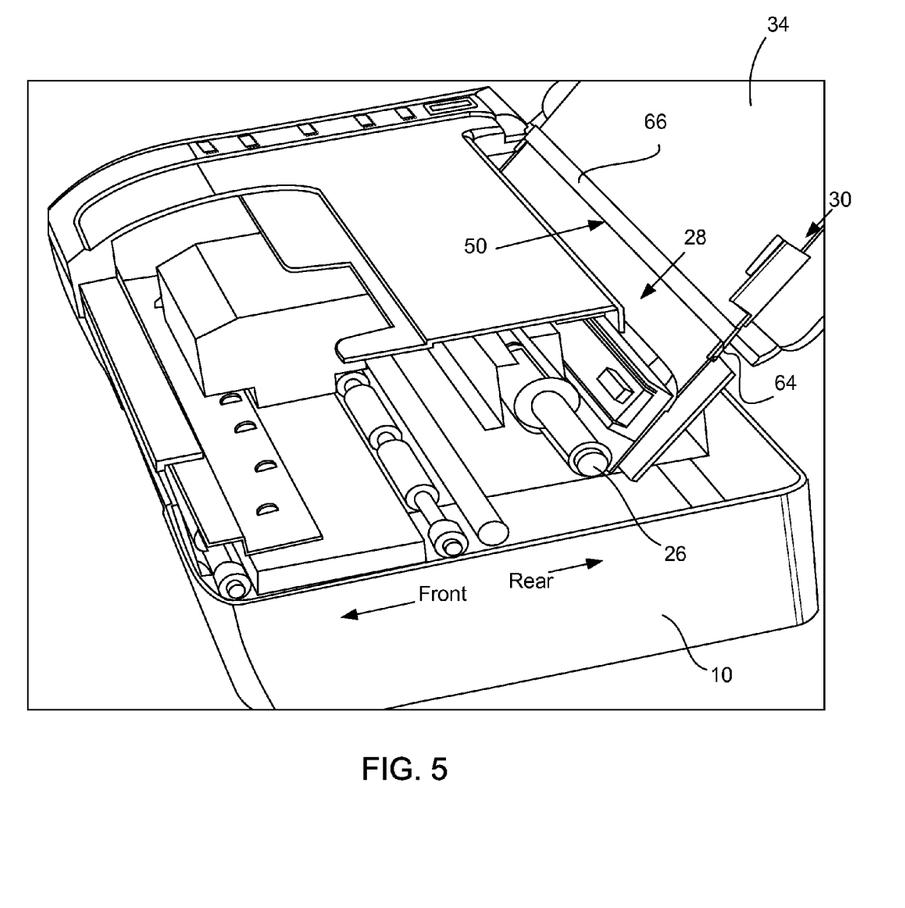
FIG. 5 is another perspective view of the printing device and the second media dispensing device of FIG. 4 loaded with blank media, in accordance with various embodiments of the present invention.
Figure 6:
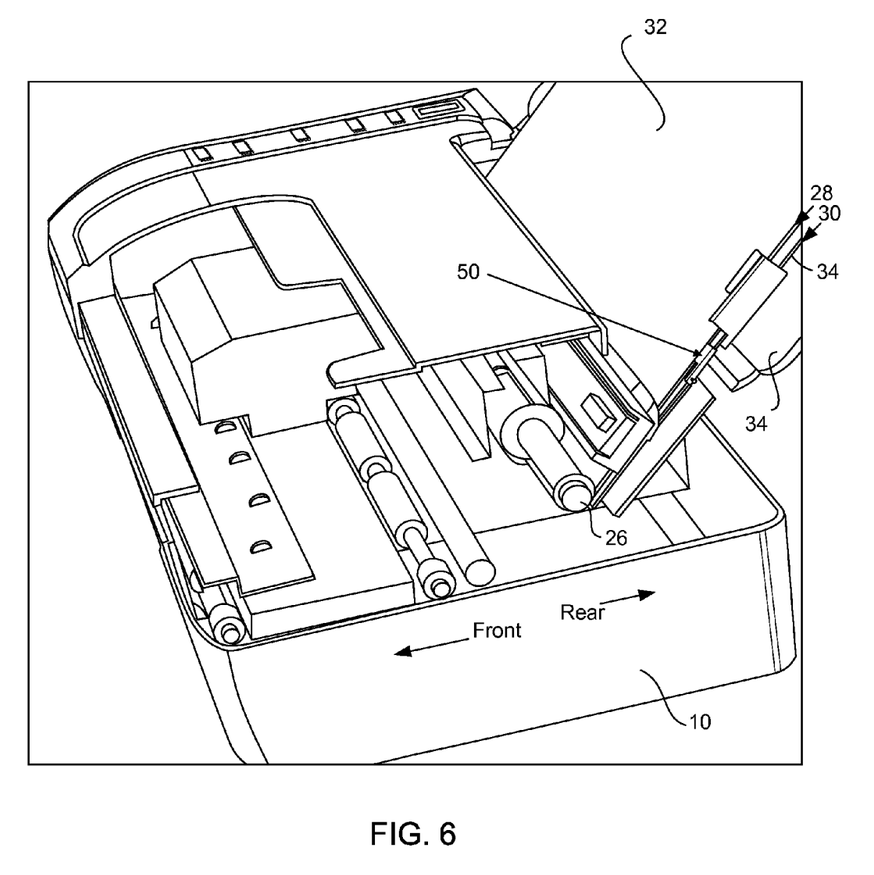
FIG. 6 is another perspective view of the printing device and the second media dispensing device of FIG. 4 loaded with both original and blank media ,in accordance with various embodiments of the present invention.

In a second embodiment of the present invention, a mechanical flipper is employed as the divider for distinguishing or separating the originals from the blanks. FIGS. 4-6 illustrate this second embodiment. More particularly, FIG. 4 is a perspective view of a printing device 10 and a flipper divider 50 that is rotatably attached to a tray 16 in accordance with the second embodiment of the present invention. As in the previous first embodiment, the flipper divider 50 defines two input slots for originals and blanks. The tray 16 and the flipper divider 50 may combine to form a media dispensing device. The flipper divider (or simply "flipper") 50 may be positioned and repositioned into at least two positions relative to the tray 16. In a first or default position, the flipper 50 is down and towards the front of the printing device 10 as depicted in FIG. 4. In this position, and as depicted in FIG. 4, only the blanks 34 may be loaded into the second input slot 30, which is located directly adjacent to the tray 16. Thus, FIG. 4 illustrates the flipper 50 being in its default position before originals 32 have been loaded, and the blanks 34 already placed into the second input slot 30.

Absent of any external influence, such as the user lifting the flipper 50, the flipper 50 may be designed to rest at its first (default) position. This may be accomplished, for example, by coupling the flipper 50 to a coil or spring that provides at least a small rotational force on the flipper 50. In particular, the flipper 50 may have a U-shape and may be comprised of an elongated member 66, having two ends, and two perpendicular members 64 coupled to the two ends of the elongated member 66. The two perpendicular members 64 may be partially rotatably coupled to the tray 16, which allows the flipper 50 to at least partially rotate relative to the tray 16. In order to accomplish this, in one embodiment, and as previously described, a coil or spring may be coupled to the perpendicular members 64 and the tray 16 in a manner such that the flipper 50 is always in the first position (i.e., down and towards the front of the printing device 10) when no external influence is being applied to the flipper 50. Of course, other alternative methods may be employed in order to accomplish this function other than using a coil or spring. Further, in an alternative embodiment, the flipper 50 may have an L-shape rather than a U-shape and may be rotatably coupled to the tray 16 at only one end.

For the embodiment, a sensor may be used to detect the position of the flipper 50. The sensor may be an opto-interrupter sensor, a contact sensor, or another type of sensor. The sensor may be used in order to detect and indicate the presence or absence of originals.

When originals are to be loaded into the first input slot 28 (as depicted in FIG. 5), which is located in front of the raised flipper 50, the flipper 50 must be raised and placed into a second upright position as depicted in FIG. 5. The originals may then be placed in front of the flipper 50 in the first input slot 28. Note that when originals are loaded into the first input slot 28, the forward force provided by the flipper (e.g., via the coil) on the originals should be small enough so that a single original can prevent the flipper 50 from settling back down into its first default position. Otherwise, the sensor may provide a false indication that no originals are present in the first input slot 28. FIG. 6 depicts when both originals 32 and blanks 34 have been loaded into the first and second input slots 28 and 30

In this second embodiment, as in the first embodiment, the printing device 10 may include firmware that uses the output of a sensor that indicates the position of the flipper 50 to determine proper behavior. For example, if the user requests that the originals are to be copied, the printing device 10, executing the firmware, must first check to see if the flipper 50 is in the up position, based on the output provided by the sensor, to determine the presence of at least one original in the first input slot 28. If it is determined that at least one original is present, the copying operation may commence.

The printing device, executing the firmware, may then control the picking and scanning of the originals until the flipper 50 falls back to its first default position, which will be detected by the sensor. The scan data that results from scanning operation of each of the originals is stored in memory until the last original has been fed into the printing device 10 and scanned. The printing device 10 may then begin the printing of the blanks based on the stored data. During each attempt to process (i.e., print) a blank, the printing device 10 may use a sensor, such as paper sensor, located in the print mechanism of the printing device 10 in order to determine if the blank has been successfully picked and brought into the correct position for printing. Note that the print mechanism sensor may detect not just the blanks, but also the originals in the common feed path.

Figure 7:
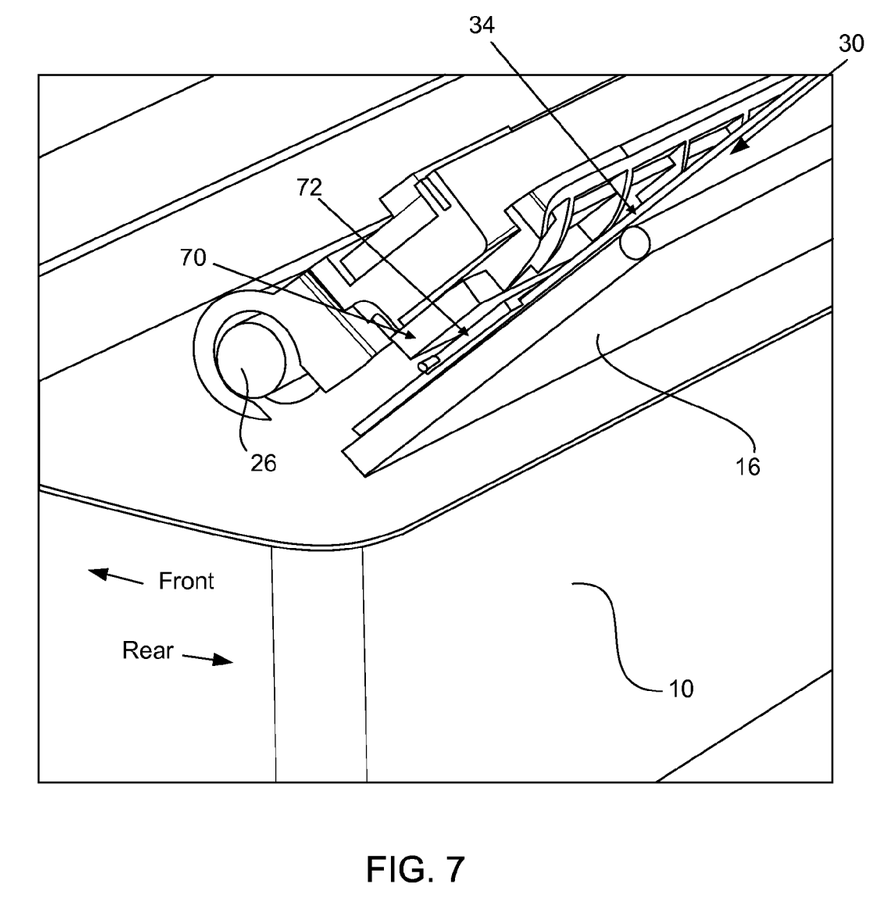
FIG. 7 is a perspective view of a printing device and a third media dispensing device loaded with blank media, in accordance with various embodiments of the present invention.
Figure 8:
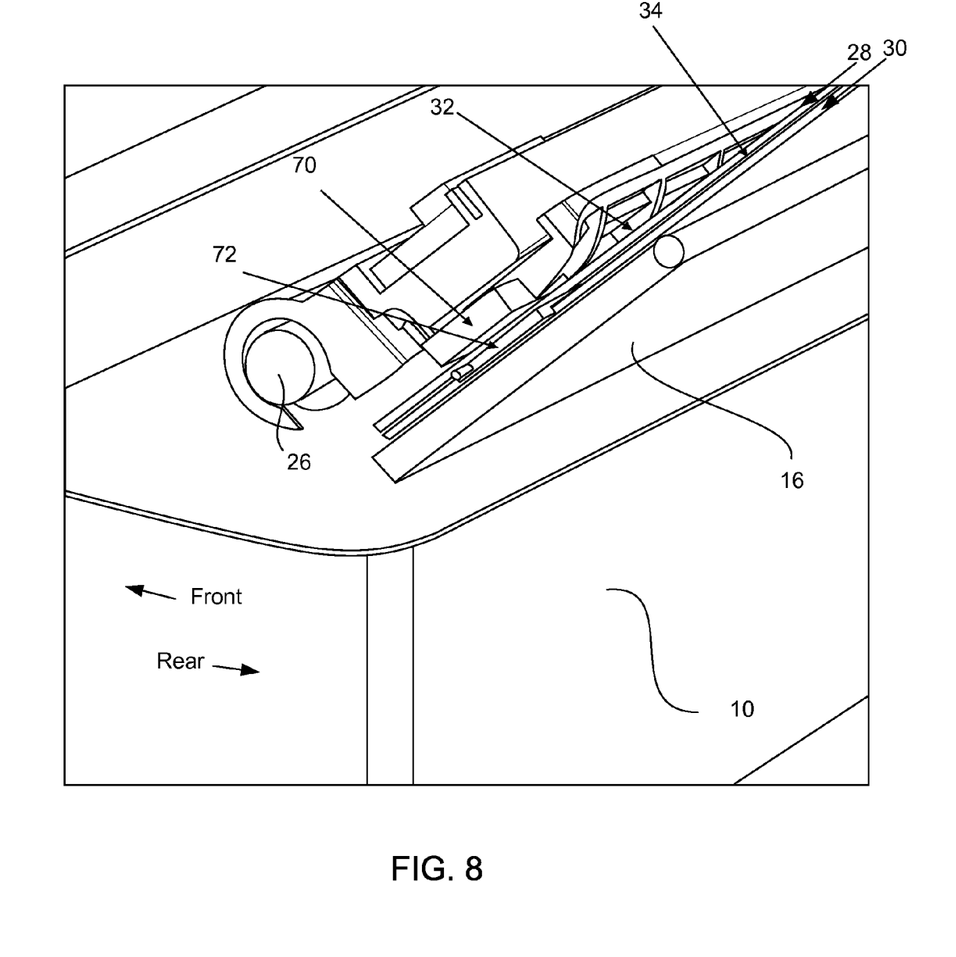
FIG. 8 is another perspective view of the printing device and the third media dispensing device of FIG. 7 loaded with both original and blank media, in accordance with various embodiments of the present invention.

In a third embodiment, a mechanical shutter is employed as the divider in order to separate and distinguish between originals and blanks as illustrated in FIGS. 7 and 8. In particular, and as before, the shutter divider may be used to define a first and a second input slot for originals and blanks. In doing so, the shutter divider separates the originals from the blanks. Referring to FIG. 7, which is a perspective view of the shutter divider (or simply "shutter") 72 in its first default position, which is against a sensor 70, mounted above a printing device 10 in accordance with the third embodiment of the present invention. The sensor 70 may be a scan element with glass encasing the scan element.

The first input slot for the originals may be located between the shutter 72 and the sensor 70, while the second input slot for the blanks may be located between the shutter 72 and the tray 16. In FIG. 7, the blanks 34 are illustrated loaded into the second input slot 30 between the shutter 72 and the tray 16. In order to load blanks 34 into the second input slot 30, the user may let the shutter 72 remain in its first default position against the sensor 70.

A bar code may be imprinted on a top surface of the shutter 72, opposite the sensor 70. Thus, the sensor 70 may be designed to read the bar code if there is no obstruction between the sensor 70 and the shutter 72 to prevent the sensor 70 from reading the bar code. If the sensor 70 is unable to read the bar code, then that may indicate that one or more originals are present in the first input slot 28 (see FIG. 8) between the shutter 72 and the sensor 70. However, if the sensor 70 is able to successfully read and recognize the bar code imprinted on the surface of the shutter 72, then that may indicate that there is or are no originals in the first input slot.

In order to load the originals into the first input slot 28, which is located at least in part between the shutter 72 and sensor 70, the user may lift the sensor 70 away from the shutter 72 in order to place the originals between the shutter 72 and the sensor 70. As described above, when an original is placed in the first input slot between the shutter 72 and the sensor 70, the bar code on the shutter 72 is obstructed from the view of the sensor 70. FIG. 8 depicts when blanks 34 have been placed into the second input slot 30, and when originals 32 have been placed into the first input slot 28.

Note that in alternative embodiments, the sensor 70 may be designed to scan for other characteristics of the surface of the shutter 70 other than bar codes. For example, in some alternative embodiments, the surface of the shutter 72 may be coated with a particular pigmentation that is distinct from the pigmentation of the original media to be loaded into the first input slot. In this case, the sensor 70 may be designed to detect the specific pigmentation of the surface of the shutter 72 in order to determine whether originals are present in the first input slot. In yet other embodiments, the sensor 70 may scan for other symbols or patterns other than bar codes on the surface of the shutter 72.

For the shutter embodiment, the printing device 10, executing its firmware, may be designed to use the data from the sensor 70 to detect the presence of the bar code on the shutter 72 to determine proper behavior. For example, if the user requests that originals are to be copied, the firmware may first collect and analyze data received from the sensor 70 to determine whether the bar code on the shutter 72 is detected. If the bar code is detected, then the printing device 10 may conclude that no originals 32 are present in the first input slot 28 between the shutter 72 and the sensor 70. On the other hand, if the bar code is detected, then the printing device 10 may conclude that at least one original is present. If at least one original 32 is present, then the copy job can proceed.

The printing device 10, executing its firmware, may then control the picking and scanning of the originals until the bar code is detected. The data for each scanned original may be stored in a memory as the originals 32 are being fed through the common feed path of the printing device 10. Once the last original has been fed and scanned by the printing device 10, as determined by the output of the sensor 70, the printing device 10 may then begin the printing of the blanks 34 that are located in the second input slot 30 between the shutter 72 and the tray 16. During each attempt to process a blank, the printing device 10 may use a sensor located in a print mechanism of the printing device 10 to determine if the original has been successfully picked and brought into the correct position for printing.

Figure 9:
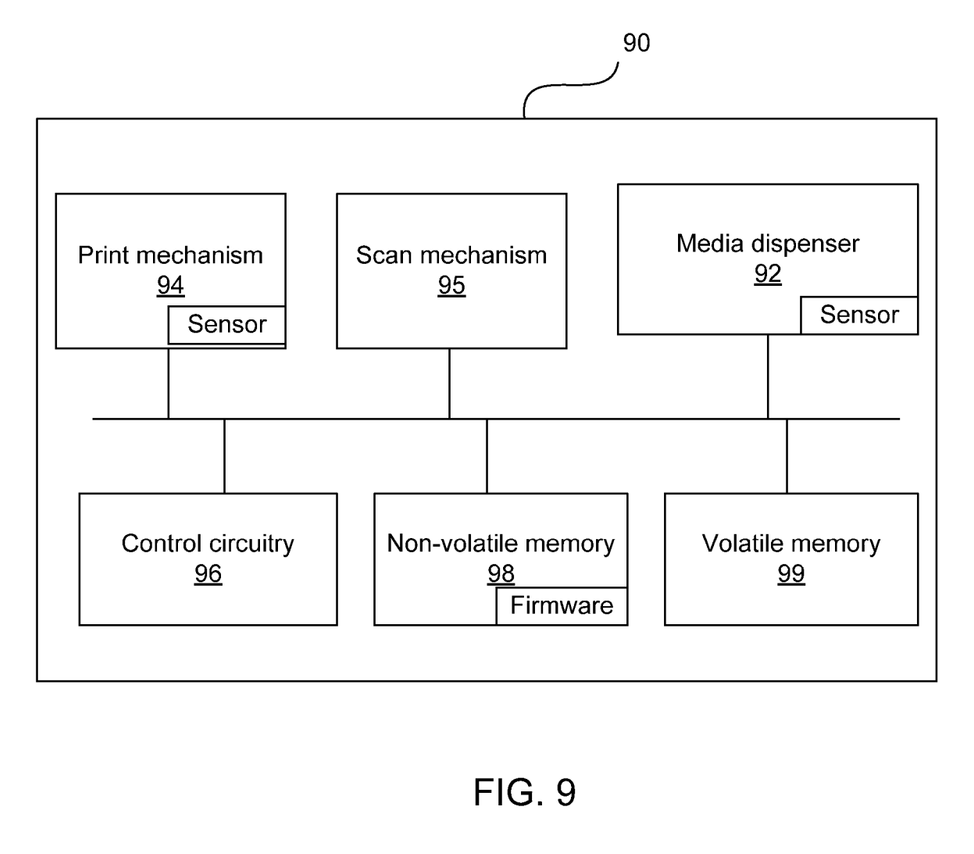
FIG. 9 schematically illustrates a printing system, in accordance with various embodiments of the present invention.

FIG. 9 is a common feed path printing system in accordance with various embodiments of the present invention. The system 90 may include a media dispenser 92 that includes at least one of the dividers previously described, a print mechanism 94, a scan mechanism 95, a control circuitry 96, a non-volatile memory 98 and a volatile memory 99. In addition to a divider, which defines a first and a second input slot, the media dispenser 92 may include a tray and a sensor to detect the presence or absence of originals in the first input slot. The scan mechanism 95 may include various electronic and mechanical components needed for scanning operations including optical components. In contrast, the print mechanism 94 may include various electronic and mechanical components needed for printing including, for example, a toner. The print mechanism 94 may further include a sensor, such as paper sensor, in order to detect the presence or absence of blanks. Although not depicted, originals and blanks to be provided to the scan and print mechanisms 95 and 94, may be provided by the media dispenser 92 via a common feed path.

The control circuitry 96 may include a processor to receive and process data from the sensors as well as to control the print and the scan mechanisms 94 and 95 based at least in part on the data received from the sensors. The control circuitry 96, and more particularly, the included processor, may execute programming instructions stored in the non-volatile memory 98 or volatile memory 99 in order to implement the various operations described previously. In some instances, the programming instructions may be in the form of firmware, which may be stored in the non-volatile memory 98, or alternatively, may be hardwired into the control circuitry 96. The volatile memory 99 may be used by the control circuitry 96 to store scanned data received from the scan mechanism 95 during a scanning operation of the originals. The stored scanned data may then used by the control circuitry 96, to control the print mechanism 94 in order to print onto the blanks supplied by the media dispenser 92.

In a fourth embodiment, mechanical components are minimally employed in order to distinguish between originals and blanks. That is, in the fourth embodiment, no dividers may be used in order to distinguish originals from blanks. The fourth embodiment may be implemented by a printing device executing a set of programming instructions stored in a storage medium (e.g., memory 98 or 99 in FIG. 9).

In this approach, an original or a blank may be picked up and fed through the common feed path of the printing device. A sensor, such as an optical sensor, which may be disposed at the beginning portion of the common feed path, may scan the first portions of the leading edge of the medium (either original or blank) being fed through the common feed path. The portions to be scanned may be scanned before the leading edge of the media reaches the print zone of the printing device. The printing device may collect data provided by the sensor of the scanned portions of the medium as the medium is being fed through the common feed path. If the printing device is unable to detect any data on the portions of the medium that was scanned (i.e., not being able to detect any text, patterns, or figures other than, for example, white), then it may conclude that the medium is a blank and may begin the printing operation once the medium reaches the print zone. Thus, in some embodiments, the sensor may scan only a portion of the surface of the medium that is within a distance from the leading edge of the medium that is equal to the distance between the scanning element (i.e., sensor) and the print zone.

This approach may be particularly reliable if blanks are white (rather than, for example, a relatively dark toned paper) and all originals have data in the portions to be scanned. In some embodiments, the portions of the medium to be scanned may be within 2 inches of a leading edge of the medium. One issue that may arise under this approach is that if an original only has a small portion of its surface with data (e.g., imprinted text or image), then the original could be accidentally printed on if the data on the surface is not detected. In this case, the printing operation may be stopped before the original reaches the print zone. In order to make the detection of originals more reliable, the user may be instructed to load originals into the device in an orientation that would place the original content of a page that it is not fully cover with information so that the information would be nearest the leading edge that first passes by the scan element in the common feed path.

In an alternative embodiment, the entire medium may be scanned before a decision is made as to whether the medium is a blank or an original. In this embodiment, originals may be fed first followed by blanks. The printing device may assume that all of the media being initially fed to it are originals. As each original is being fed through the common feed path, each original is being scanned. When the first blank is fed through the common feed path, the printing device will scan the entire first blank to determine that it is, indeed, a blank. Of course, since the first blank may have to go completely through the common feed path in order for the printing device to determine that it is a blank, the first blank may not be printed on. However, based on the identification of the first blank, the printing device may be programmed to recognize that subsequent media fed into the printing device will be blanks. As a result, the printing device may commence its printing operation beginning on the second blank to be fed to the printing device.

Figure 10:
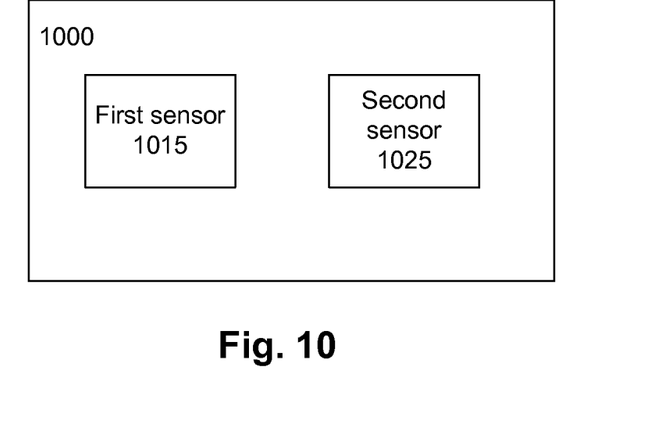
FIG. 10 schematically illustrates a printing device including a first sensor and a second sensor, in accordance with various embodiments of the present invention.

FIG. 10 schematically illustrates a printing device 1000 including a first sensor 1015 and a second sensor 1025, in accordance with various embodiments of the present invention. The printing device 1000 may be similar to the printing device 10 of FIGS. 1, 2, . . . and/or 8. The first sensor 1015 is configured to detect whether original media has been loaded onto the common input tray; and the second sensor 1025 is configured to detect whether blank media has been loaded onto the common input tray.

Although specific embodiments have been illustrated and described herein, it will be appreciated by those of ordinary skill in the art and others, that a wide variety of alternate and/or equivalent implementations may be substituted for the specific embodiments illustrated and described without departing from the scope of the present invention. This application is intended to cover any adaptations or variations of the embodiments discussed herein. Therefore, it is manifested and intended that various embodiments of the invention be limited only by the claims and the equivalents thereof.

What is claimed is:

1. A multifunction device configured to i) scan original media and ii) print onto blank media, the multifunction device comprising:
   a common feed slot configured to receive both i) original media to be scanned by the multifunction device and ii) blank media to be printed onto by the multifunction device;
   a common input tray onto which the original media and the blank media are to be loaded;
   a roller configured to individually feed the original media and the blank media from the common input tray into the common feed slot; and
   a scanning element configured to
      scan an entirety of the blank media prior to determining that the blank media is blank, and
      scan an entirety of the original media prior to determining that the original media is an original.

2. The multifunction device of claim 1, wherein the common input tray comprises:
   an edge guide configured to align media as the media is being fed into the common feed slot by the roller.

3. The multifunction device of claim 1, wherein the multifunction device is configured to:
   based on the scanning element scanning the entirety of the original media, determine that the original media that is scanned is original.

4. The multifunction device of claim 1, wherein the multifunction device is configured to:
   based on the scanning element scanning the entirety of the blank media, determine that the blank media that is scanned is blank.

5. The multifunction device of claim 4, wherein the multifunction device is further configured to:
   based on determining that the blank media that is scanned is blank, print on the blank media.

6. The multifunction device of claim 4, wherein the blank media is a first blank media, wherein a second blank media is received by the common feed slot immediate subsequent to receiving the first blank media, and wherein the multifunction device is further configured to:
   based on determining that the first blank media that is scanned is blank, determine that the second blank media is blank; and
   based on determining that the second blank media is blank, print on the second blank media.

7. The multifunction device of claim 6, wherein the multifunction device is further configured to:
   based on determining that the first blank media that is scanned is blank, refrain from printing on the first blank media.

8. The multifunction device of claim 1, wherein the multifunction device does not include a divider to distinguish the original media from the blank media, when the original media and the blank media are loaded onto the common input tray.

9. A method of operating a multifunction device that is configured to i) scan original media and ii) print onto blank media, the method comprising:
   individually feeding, by a roller of the multifunction device, original media and blank media from a common input tray of the multifunction device into a common feed slot of the multifunction device;
   receiving, in the common feed slot of the multifunction device, both i) the original media to be scanned by the multifunction device and ii) the blank media to be printed onto by the multifunction device;
   scanning an entirety of the blank media prior to determining that the blank media is blank; and
   scanning an entirety of the original media prior to determining that the original media is an original.

10. The method of claim 9, further comprising:
    based on the scanning the entirety of the original media, determining that the original media that is scanned is original.

11. The method of claim 9, further comprising:
    based on scanning the entirety of the blank media, determining that the blank media that is scanned is blank.

12. The method of claim 11, further comprising:
    based on determining that the blank media that is scanned is blank, printing on the blank media.

13. The method of claim 11, wherein the blank media is a first blank media, wherein a second blank media is received by the common feed slot immediate subsequent to receiving the first blank media, and wherein the method further comprises:
    based on determining that the first blank media that is scanned is blank, determining that the second blank media is blank; and
    based on determining that the second blank media is blank, printing on the second blank media.

14. The method of claim 9, wherein the multifunction device does not include a divider to distinguish the original media from the blank media, when the original media and the blank media are loaded onto the common input tray.

15. A method of operating a multifunction device, the method comprising:
    individually feeding, by a roller of the multifunction device, a plurality of media from a common input tray of the multifunction device into a common feed slot of the multifunction device;
    receiving, in the common feed slot of the multifunction device, the plurality of media, wherein individual ones of the plurality of media is one of (i) original media that to be scanned by the multifunction device or ii) blank media to be printed onto by the multifunction device;
    scanning, by a scanning element of the multifunction device, at least a part of a first media of the plurality of media; and
    based on scanning at least the part of the first media of the plurality of media, determining whether the first media of the plurality of media is the blank media or the original media.

16. The method of claim 15, wherein determining whether the first media of the plurality of media is the blank media or the original media further comprises:
    based on scanning at least the part of the first media of the plurality of media, determining whether data is printed on at least the part of the first media that is scanned; and
    based on determining whether data is printed on at least the part of the first media that is scanned, determining whether the first media of the plurality of media is the blank media or the original media.

17. The method of claim 16, wherein determining whether the first media of the plurality of media is the blank media or the original media further comprises:
    performing one of
       (i) in response to determining that data is printed on at least the part of the first media that is scanned, determining that the first media of the plurality of media is the original media; and (ii) in response to determining that no data is printed on at least the part of the first media that is scanned, determining that the first media of the plurality of media is the blank media.

18. The method of claim 15, further comprising:
based on scanning at least the part of the first media of the plurality of media, determining that the first media of the plurality of media is the blank media; and
based on determining that the first media of the plurality of media is the blank media, printing on the first media.

19. The method of claim 15, further comprising:
based on scanning at least the part of the first media of the plurality of media, determining that the first media of the plurality of media is the original media; and
based on determining that the first media of the plurality of media is the original media, refraining from printing on the first media.

20. The method of claim 15, wherein the multifunction device does not include a divider to distinguish the original media from the blank media, when the original media and the blank media are loaded onto the common input tray.

\* \* \* \* \*